United States Patent [19]

Jabero

[11] Patent Number: 4,844,187

[45] Date of Patent: Jul. 4, 1989

[54] FUTURE WEIGHT MACHINE

[76] Inventor: Thair F. Jabero, 6367 Dalton Dr., Flushing, Mich. 48433

[21] Appl. No.: 232,093

[22] Filed: Aug. 15, 1988

[51] Int. Cl.$^4$ ...................... G01G 23/38; G01G 19/44
[52] U.S. Cl. ..................................... 177/5; 177/25.19
[58] Field of Search ................................ 177/5, 25.19

[56] References Cited

U.S. PATENT DOCUMENTS

| | | | |
|---|---|---|---|
| 3,512,593 | 5/1970 | Edmondson | 177/5 |
| 4,301,879 | 11/1981 | Dubow | 177/5 |
| 4,577,710 | 3/1986 | Ruzumna | 177/25.19 |
| 4,629,015 | 12/1986 | Fried et al. | 177/25.19 |
| 4,773,492 | 9/1988 | Ruzumna | 177/25.19 |

Primary Examiner—George H. Miller, Jr.
Attorney, Agent, or Firm—Arnold S. Weintraub; Gerald R. Black

[57] ABSTRACT

This apparatus will provide an individual with personal dietary information specifically tailored to the health needs of the particular individual. The apparatus includes means for determining the weight of the individual, including a weighting platform. The individual will manually enter data pertaining to the age, sex, and height as well as personal dietary restrictions. The apparatus includes means for processing and analyzing the data for the individual, and means for supplying dietary information pertaining to the individual. Another embodiment of the invention includes means for determining weight and the pulse rate of the individual, along with an exercise during aerobic exercise. The apparatus analyzes the data and supplies statistical information to the individual concerning the general physical condition of the individual. Both embodiments may contain means for storing the data pertaining to the individual, whereby the stored data is later recalled and used in providing information of the individual.

9 Claims, 1 Drawing Sheet

FUTURE WEIGHT MACHINE

BACKGROUND OF THE INVENTION

1. Field of the Invention

The present invention relates to a new weight and health monitoring apparatus, and more particularly, to an apparatus that provides personal information regarding the individual's general physical condition and diet based upon data supplied to the apparatus.

2. Background Art

There have been numerous weighing type machines, whereby an individual may monitor weight progress during periods of weight gain or loss.

U.S. Pat. No. 2,146,727 discloses a weight and height measuring apparatus to determine if the user is overweight, underweight, or normal weight. Overweight and underweight people receive a card containing suggested diets. The cards may also contain other health hints regarding exercise, sleep, etc. The machine takes into account the differences of the weight of men and women.

U.S. Pat. No. 2,836,980 discloses an apparatus for measuring the height and weight of an individual and compares this information against medically recognized standards. The standard weight will also be displayed. The standard is determined according to age and sex. The apparatus may be coin operated.

U.S. Pat. No. 3,512,593 discloses a personal weight recorder that is mechanical and employs a stylus to chart the day-to-day changes in the weight of an individual. This recorder can be helpful in charting such things as the progress of a weight-reducing diet, the recovery of a patient from a serious illness, or the advance of disease.

U.S. Pat. No. 3,967,690 discloses a digital readout scale having an accuracy of tenths or hundreths of a pound. A memory circuit stores information to provide a readout of the relative difference with the prior weight. A switching circuit enables the scale to be used by several different people. The scale may be used to chart the growth of children.

U.S. Pat. No. 4,423,792 discloses an electronic scale which tracks the weight of an individual over a period of time to determine weight differentials and providing the individual with weight related information (e.g. - program start date, total weight change since the start of program), to determine further course of action for weight control.

In this information age, people are no longer willing to insert a coin into a machine merely to learn their weight. As we become more health conscious, people are attempting to extend the number of healthy years by exercising and being more physically active. The way that people perceive food is changing as we become more health conscious. The modern approach to food is that by controlling the quantity and types of food that we eat, we can also improve our appearance, strength, performance, and general overall health.

Two excellent barometers of general physical fitness are weight and pulse rate. As we engage in our regular exercise programs, which include intense physical activities (such as jogging, aerobics, biking, skiing, golf, tennis, and swimming) we continually monitor weight and pulse rate data to determine our overall physical fitness. Also, we people have been increasingly health-conscious, we want to know how we can might modify our diets to improve general physical health, job performance, relieve stress, retard the aging process, and improve the overall quality of our lives. In addition, we are each unique regarding dietary preferences and general health conditions that impact the type and quantity of food that we eat.

SUMMARY OF THE INVENTION

What is needed is a new type of apparatus that provides health conscious individuals not only with personal weight information but also with progress and history data that is useful in monitoring progress regarding diets and physical fitness programs. Such machines could be available to the public in health spas, drug stores, airports, malls, and the like.

This apparatus will provide personalized dietary information for the particular individual. The apparatus includes means for determining the weight of the individual. The individual will manually enter age (or birthday), sex, and height data, along with personal dietary restrictions, such as low salt, low sugar, low cholesteral, food allergies, etc. The apparatus includes means for processing and analyzing the data, and means for supplying dietary information pertaining to the individual, which takes into account the age, height, sex, dietary restrictions, and current weight data.

Another embodiment of the invention provides information concerning the general physical condition of the individual. The apparatus is similar to the first embodiment, and also includes means for determining the pulse rate of the individual. The individual again must manually enter age, sex, and height data. The apparatus analyzes the data and supplies statistical information concerning the general physical condition of the individual which takes into account the age, sex, height, current weight, and pulse rate data.

Both embodiments may also contain means for storing the data pertaining to the individual, whereby the stored data is useful in providing historical type dietary information, and exercise progress information regarding the individual's physical fitness program.

For a more complete explanation of the future weight machine of the present invention, reference is made to the following detailed description and accompanying drawings in which the presently preferred embodiments of the invention are illustrated by way of example. It is expressly understood, however, that the drawings are for purposes of illustration and description only, and are not intended as a definition of the limits of the invention. Throughout the following description and drawings, identical reference numbers refer to the same component throughout the several views.

DETAILED DESCRIPTION OF THE INVENTION

Figures 1, 2:
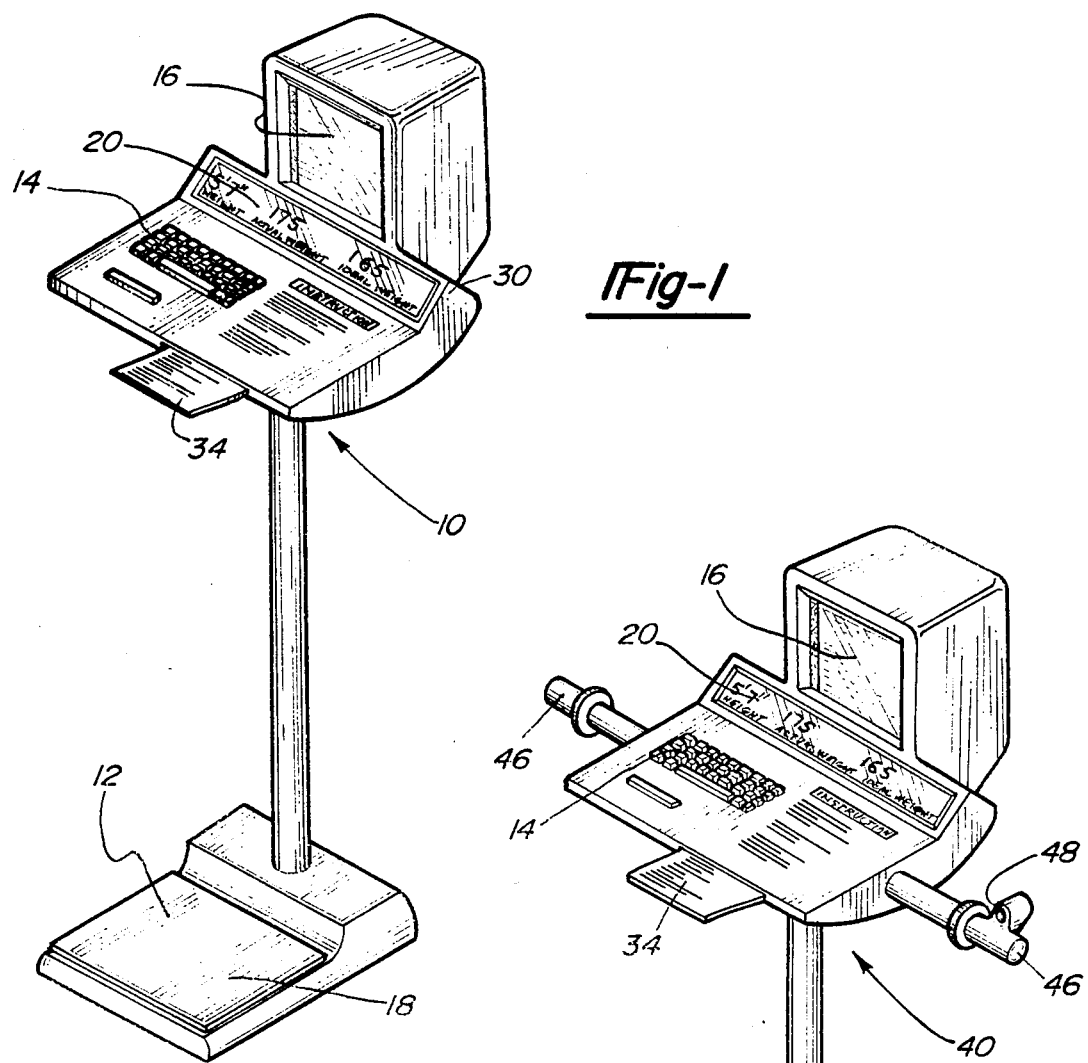
FIG. 1 is a perspective view of the preferred embodiment of the apparatus of the present invention, including a data entry unit, a television monitor, a weighing means, and means for supplying the information to the user.
FIG. 2 is a perspective view of a second embodiment of the apparatus of the present invention, which includes all of the features of the first embodiment in addition to a means for exercising and means for measuring the pulse during the exercise.

Referring now to the drawings, FIG. 1 depicts the preferred embodiment of the future weight machine 10. The apparatus includes means 12 for determining weight data pertaining to the individual, means 14 for enabling the individual to enter data pertaining to age, sex, and height, means 30 for processing the weight data and the pulse rate data in conjunction with the data pertaining to the age, sex, and height, and means 34 for supplying statistical information in writing concerning the general physical condition of the individual based upon the processed data. The apparatus includes means 12 for determining the weight of the individual, such as a scale unit. The individual will manually enter pertinent age, sex, and height data. This information is entered through a data entry keyboard 14, where a television monitor screen 16 displays the questions and answers in a multiple choice format. The information may also be entered directly through the television monitor 16, where the data entry unit is incorporated into the monitor screen, so that the individual merely touches the screen to make the appropriate choices.

The scale unit 12 is similar to a conventional bathroom type weight measuring device, which includes a scale platform 18, which is spring-biased upward. The weight measuring mechanism provides a digital readout of the weight on the television monitor 16, or on a separate digital readout 20 which is in electrical contact with the scale. The signal from the scale unit 12 to the computer corresponds to the weight of the individual.

The means 30 for processing the data (weight, pulse rate, age, height, and sex) may be a micro or an IBM PC. The software is not commercially available, but is state-of-the-art for Weight Watchers type programs and the like. The means 34 for supplying the written statistical information is a letter qualityprinter, such as an Epson LQ-150 or the like. The printer is compatible with the computer and uses paper that can be easily separated from the roll, after the sheet has been used.

Weight information as a function of height, age, and sex is well known and readily available. Such data would be stored in a computer memory within the apparatus 10. Hence, if an overweight person were to use the machine 10, it would be necessary to design a diet for that person to gradually lose weight over a period of time. If an underweight person were to use the machine 10, a diet would be proscribed to gradually increase the person's weight. If a person were to use the machine 10 who is in the range of normal weight, the person would be so advised and provided with a healthy diet, designed to maintain the present weight. Similarly, information correlating pulse rate with height, weight, age, and sex is generally available and this data would be similarly stored in the computer memory bank.

The individual may also enter personal dietary restrictions, including health conditions that may affect the food that the individual can eat, such as: low salt, low sugar, low cholesteral, food allergies (milk, eggs, etc.), vegetarian, no red meat, no pork, no shellfish, constipation, pregnancy, high fiber, low fiber, ulcer, colitis, low acid. The individual may also enter information that would be useful in determining the number of calories that the body woud burn in a normal day; such as the amount of, type, and regularity of normal exercise, indicator's of the individual's metabolism rate, and the amount of physical activity normally involved in the person's day.

Healthful dietary information is generally known, with different foods depending upon the age, sex, and deviation from the standard weight for various individuals. The portions of meat, vegetables, bread, diary, fruits, grains, liquids, to be consumed can be varied for an individual based upon personal data. This dietary information can be further refined based upon dietary restrictions, as some foods will be substituted for others. In some rare instances, it may be necessary to suggest to the individual the taking of a dietary supplement if the dietary restrictions prevent the maintenance of a well-balanced diet.

The apparatus 10 preferably has a capability to store information for a particular individual for future use. The information may be stored under the person's name, or a special numerical code may be assigned, so that the information can be retrieved by that individual for further data analysis at some later date. Hence, when the individual returns to the apparatus 10 in two or three weeks, the apparatus 10 can use the weight and pulse rate data at the previous visit to determine how well the diet or the exercise program has been followed, so that the apparatus can track the progress that the individual has made.

The individual will be informed as to the regularity that he should use the monitoring apparatus. For example, if the person is chronically over or underweight, it may be necessary to monitor the progress of the diet more frequently than for a person without a weight problem. Also, if the individual is engaged in a rigorous exercise program, it may be necessary to monitor progress frequently.

The machine 10 will also have the capability to enable the individual to select a desired weight and to have a diet and exercise program so designed. For example, if a man were a body builder or a football player, he would need to have a diet designed for bulking up and weight maintenance somewhere above the normal weight for such an individual.

The apparatus 10 includes means for processing and analyzing the data for the individual, and means for supplying dietary information pertaining to the individual, which takes into account the age, height, sex, dietary restrictions, and current weight data. The individual may enter the estimated weight of the clothing being worn, or the apparatus 10 may automatically employ a standard correction factor. The apparatus 10 may also contain means for storing the data pertaining to the individual, whereby the stored data is useful in providing historical type dietary information to the individual.

Another embodiment 40 of the invention is depicted in FIGURE 2. In this embodiment the apparatus 40 is used to calculate and provide information concering the general physical condition of the individual. The apparatus 40 includes means for determining the weight of the individual, and preferably has a weighing platform. The apparatus 40 also includes means 42 for determining pulse rate data, preferably including an exercise (such as one or more steps 44 for the individual to ascend and descend) which would provide valuable aerobic pulse rate data. Such devices for monitoring pulse rate are state of the art, whereby the individual either grasps two handles 46, or merely inserts a digit into a cavity 48.

As an alternative, the individual may monitor weight and pulse rate before a workout and during or after the workout to determine the body's progress throughout various phases of the fitness program. The individual again must manually enter age, sex, and height data, and such other information that may be pertinent to determining general physical condition (such as, whether or not the individual a smoker, whether or not the individual takes any prescribed medication, and if so what medications and in what dosages). The apparatus 10 analyzes the data and supplies statistical information to the individual concerning the general physical condition of the individual which takes into account the age, sex, height, current weight, and pulse rate data. The apparatus 10 may also contain means for storing the data pertaining to the individual, whereby the stored data is useful in providing historical type regarding the general physical condition of the individual.

The apparatus 10 may provide the following type of information: the actual weight of the individual; the ideal weight for the individual; a progress report for the individual tracking the history since the last weight-in of the individual; dietary information tailored to the individual complete with calories per serving of each item, target calories per day, and a complete suggested diet to be followed to close in upon the ideal weight for that individual; average daily calorie consumption for weight control program (gain or loss), guidelines as to how often progress should be monitored and what individual can expect to lose or gain if they follow the diet; and daily calorie consumption.

The apparatus may be multi-lingual so that individuals of various nationalities may use it (English, French, Spanish, Arabic, Russian, Japanese, or Chinese). The machine may have an option of switching from the American foot-pounds system to the metric system. The apparatus may also contain means for being coin or bill operated, whereby the individual must insert money before engaging the computer.

While the future weight machine has been described in conjunction with several specific embodiments, it is evident that many alternatives, modifications, and variations will be apparent to those skilled in the art in light of the disclosure herein. It is intended that all such alternatives, modifications, and variations are included herein that fall within the spirit and scope of the appended claims.

I claim:

1. An apparatus to provide personalized health-related information to an individual, the apparatus comprising:
   (a) means for determining weight data for the individual, including a weighing platform;
   (b) means for entering data pertaining to the age, sex, height, and dietary restrictions of the individual;
   (c) means for processing the weight data in conjunction with the data pertaining to the age, sex, height and dietary restrictions for the individual; and
   (d) means for supplying the individual with personalized dietary information in writing based upon the processed data.

2. The apparatus of claim 1, further comprising means for storing and retrieving the data, the stored data being readily identifiable to the individual.

3. The apparatus of claim 2, wherein the written information also takes into account the data that is stored.

4. The apparatus of claim 1, further comprising means for determining pulse rate data for the individual, and the pulse rate data being useful in determining the dietary information.

5. An apparatus to supply information concerning the general physical condition of the individual, the apparatus comprising:
   (a) means for determining weight data pertaining to the individual;
   (b) means for determing pulse rate data pertaining to the individual;
   (c) means for enabling the individual to enter data pertaining to age, sex, and height;
   (d) means for processing the weight data and the pulse rate data in conjunction with the data pertaining to the age, sex, and height; and
   (e) means for supplying statistical information in writing concerning the general physical condition of the individual based upon the processed data.

6. The apparatus of claim 5, further comprising means for storing and retrieving the data, the stored data being readily identifiable to the individual.

7. The apparatus of claim 6, wherein the written statistical information includes a progress report based upon the stored data.

8. The apparatus of claim 5, further comprising an exercise for the individual to engage in, while the pulse rate is being monitored.

9. The apparatus of claim 5, wherein data is entered pertaining to any special health restrictions pertaining to the individual, wherein such health information is useful in determining the general physical condition of the individual.

* * * * *